(12) United States Patent
Freiberger et al.

(10) Patent No.: US 9,008,509 B2
(45) Date of Patent: Apr. 14, 2015

(54) MEASUREMENT OF OPTICAL PERFORMANCE FOR PASSIVE WDM SYSTEMS

(75) Inventors: Michael B. Freiberger, Allen, TX (US); Evan L. Klassen, Skiatook, OK (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 823 days.

(21) Appl. No.: 13/220,204

(22) Filed: Aug. 29, 2011

(65) Prior Publication Data

US 2013/0051795 A1 Feb. 28, 2013

(51) Int. Cl.
- *H04B 10/08* (2006.01)
- *H04B 10/079* (2013.01)
- *H04J 14/02* (2006.01)
- *H04B 17/00* (2006.01)

(52) U.S. Cl.
CPC ...... *H04B 10/07955* (2013.01); *H04J 14/0221* (2013.01); *H04J 14/0227* (2013.01); *H04J 14/0267* (2013.01); *H04J 14/0275* (2013.01)

(58) Field of Classification Search
CPC .................................................. H04B 10/07955
USPC .................................................. 398/38, 25, 34
See application file for complete search history.

(56) References Cited

U.S. PATENT DOCUMENTS

| | | | | |
|---|---|---|---|---|
| 5,825,516 A | * | 10/1998 | Walsh | 398/40 |
| 2005/0078957 A1 | * | 4/2005 | Hendow | 398/33 |
| 2008/0089681 A1 | * | 4/2008 | Yano | 398/33 |

* cited by examiner

*Primary Examiner* — Daniel Dobson (57) ABSTRACT

A system, a device, and a method include a network interface device that measures optical power of a passive optical device; generates optical power data, and stores the optical power data. The system, the device, and the method, also includes generating alarms based on the optical power data and communication with remote network interface devices via the passive optical device.

21 Claims, 10 Drawing Sheets

MEASUREMENT OF OPTICAL PERFORMANCE FOR PASSIVE WDM SYSTEMS

BACKGROUND

In an optical network, Wavelength Division Multiplexing (WDM) or Dense Wavelength Division Multiplexing (DWDM) permits the multiplexing of multiple optical carriers onto a single optical fiber by using different wavelengths of laser light. DWDM can carry more optical channels compared to, for example, Coarse Wavelength Division Multiplexing (CWDM). As a result, DWDM is used in optical networks in which denser optical channel spacing is needed. Passive WDMs separate wavelengths using passive optical components.

Optical performance of passive WDM networks presents various challenges to service providers and network providers, such as the collection of performance data, identifying performance issues, remedying failures efficiently in terms of time, cost, resources (e.g., personnel, etc.), etc.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

According to an exemplary embodiment, a network interface device having optical performance monitoring capabilities is used to monitor a passive optical device. According to an exemplary embodiment, the performance monitoring pertains to optical power. According to other embodiments, the performance monitoring pertains to other types of performance metrics (e.g., transmission delay, dispersion, etc.).

According to an exemplary embodiment, the network interface device stores optical power data based on the performance monitoring. The optical power data may be accessed by network administrators and/or other network management devices. The optical power data may be used to facilitate fault isolation in an optical network (e.g., a WDM optical network, a DWDM optical network, a CWDM optical network, etc.) and/or facilitate other types of network management-related facets (e.g., ensuring optical service meets contractual obligations (service level agreements),etc.). Additionally, or alternatively, the network interface device may output the optical power data to other network management devices and/or to network administrators.

According to an exemplary embodiment, the network interface device may identify when a problem exists based on the performance monitoring and generate appropriate alarm information.

According to an exemplary embodiment, the network device is communicatively coupled to other network interface devices via the passive optical device. In this way, network administrators may manage the performance of local and remote sites of the optical network. A further description of exemplary embodiments is discussed below.

Figure 1A:
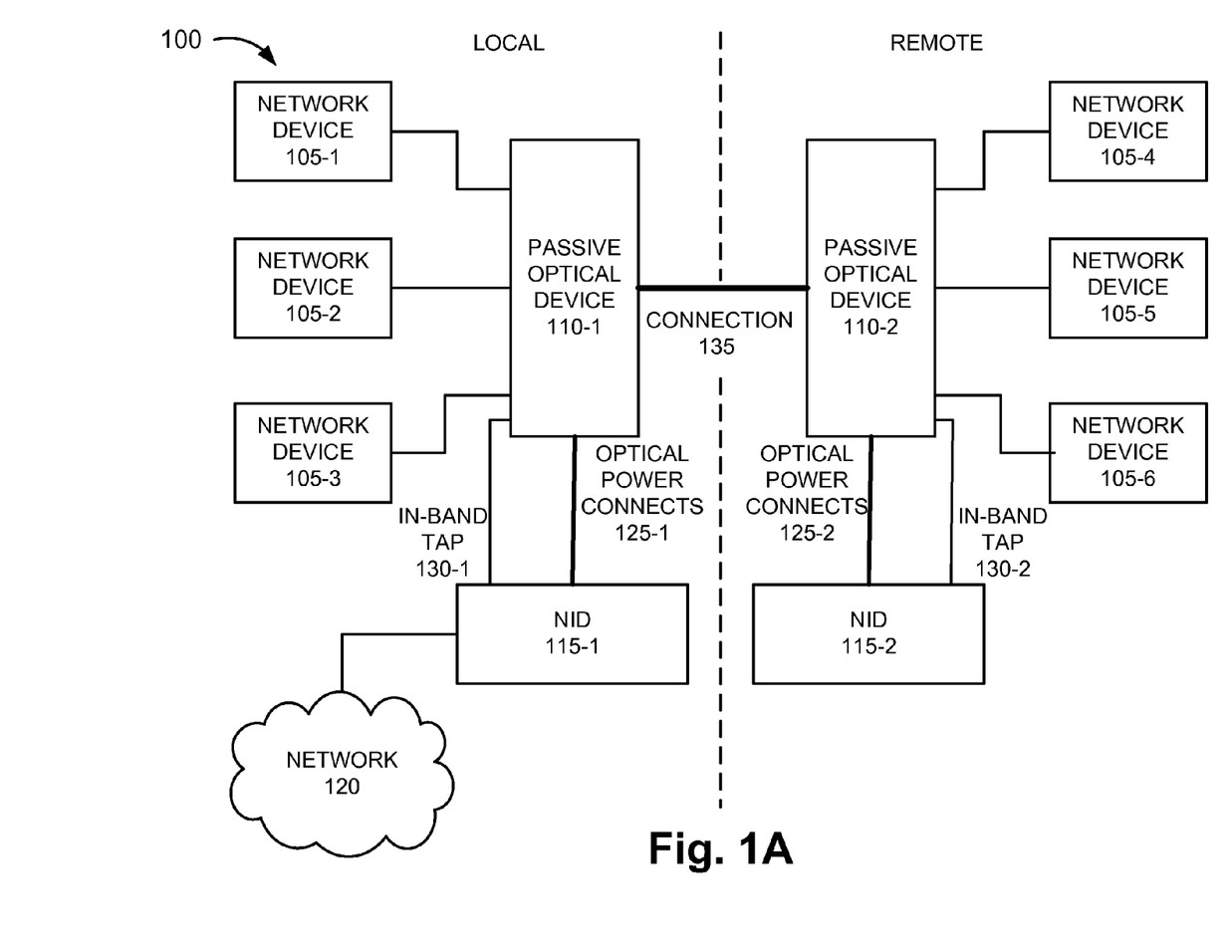
FIG. 1A is a diagram illustrating an exemplary passive WDM network in which an exemplary embodiment of performance management may be implemented.

FIG. 1A is a diagram illustrating an exemplary passive WDM network in which an exemplary embodiment of performance management may be implemented. As illustrated in FIG. 1A, an exemplary environment 100 includes network devices 105-1 through 105-6 (referred to individually as network device 105 or collectively as network devices 105), passive optical devices 110-1 and 110-2 (referred to individually as passive optical device 110 or collectively as passive optical devices 110), network interface devices (NIDs) 115-1 and 115-2 (referred to individually as network interface device 115 or collectively as network interface devices 115), and network 120.

The passive WDM network may include one or more local sites and one or more remote sites. As an example, a local site may correspond to a central office, a private portion of an enterprise network, etc., and a remote site may correspond to customer premises, outside of the enterprise network, etc.

The number of devices and the configuration in environment 100 are exemplary and provided for simplicity. According to other embodiments, environment 100 may include additional devices, fewer devices, different devices, and/or differently arranged devices than those illustrated in FIG. 1A.

As further illustrated in FIG. 1A, an optical power connects 125-1 connect network interface device 115-1 to passive optical device 110-1, and an optical power connects 125-2 connects network interface device 115-2 to passive optical device 110-2, an in-band tap 130-1 connects network interface device 115-1 to passive optical device 110-1, and an in-band tap 130-2 connects network interface device 115-2 to passive optical device 110-2, a connection 135 connects passive optical devices 110. For example, optical power connects 125 may take the form of a fiber path cable (e.g., fiber jumper). Alternatively, optical power connects 125 may be integrated at the module level. The connections illustrated in FIG. 1A are exemplary.

Network device 105 includes an optical node. By way of example, network device 105 may include an optical regeneration node, an optical transmitting/receiving node, or an Optical switching node. As a further example, network device 105 may include of an add-drop Multiplexer (ADM), a next generation add-drop multiplexer (NGADM), a switch, a router, a transponder, a muxponder, etc.

Passive optical device 110 includes an optical node. Passive optical device 110 may combine or split transmission data (e.g., optical power) between optical fibers. For example, passive optical device 110 may take the form of a passive optical coupler and splitter, a passive optical splitter, or a passive optical coupler. In this example, passive optical device 110 is configured as a point-to-point system. However, according to other implementations, passive optical device 110 may be configured differently, and may include a fixed or a reconfigurable optical ADM.

Network interface device 115 includes a device having optical performance monitoring capabilities. According to an exemplary embodiment, network interface device 115 monitors an optical power (e.g., not on a per wavelength basis) of passive optical device 110. According to other embodiments, network interface device 115 may monitor optical power on a per wavelength basis. According to still other embodiments, network interface device 115 may monitor other types of optical metrics associated with optical signals, such as, transmission delay, dispersion, etc.

According to an exemplary embodiment, network interface device 115 generates alarm information (e.g., threshold alarms, optical alarms, etc.). For example, network interface device 115 identifies when a condition for an alarm occurs based on the optical performance data obtained based on the optical performance monitoring.

According to an exemplary embodiment, network interface device 115 may be an Ethernet network interface device or an Ethernet Enhanced network interface device (EENID), which tends to be low in cost. According to other embodiments, network interface device may be another type of network interface device (e.g., a Synchronous Optical Network (SONET) NID, etc.). Network interface device 115 will be described further below.

Network 120 includes a network to permit communication with network interface devices 115. For example, network administrators may obtain optical performance data from network interface devices 115 at a central office. According to an exemplary embodiment, network 120 may include a virtual local area network. According to other embodiments, network 120 may include another type of network.

Connection 135 includes an optical fiber that provides a communication coupling between passive optical devices 110. According to an exemplary embodiment, connection 135 may not include in-line amplification. According to other exemplary embodiments, connection 135 may include in-line amplification.

Figure 1B:
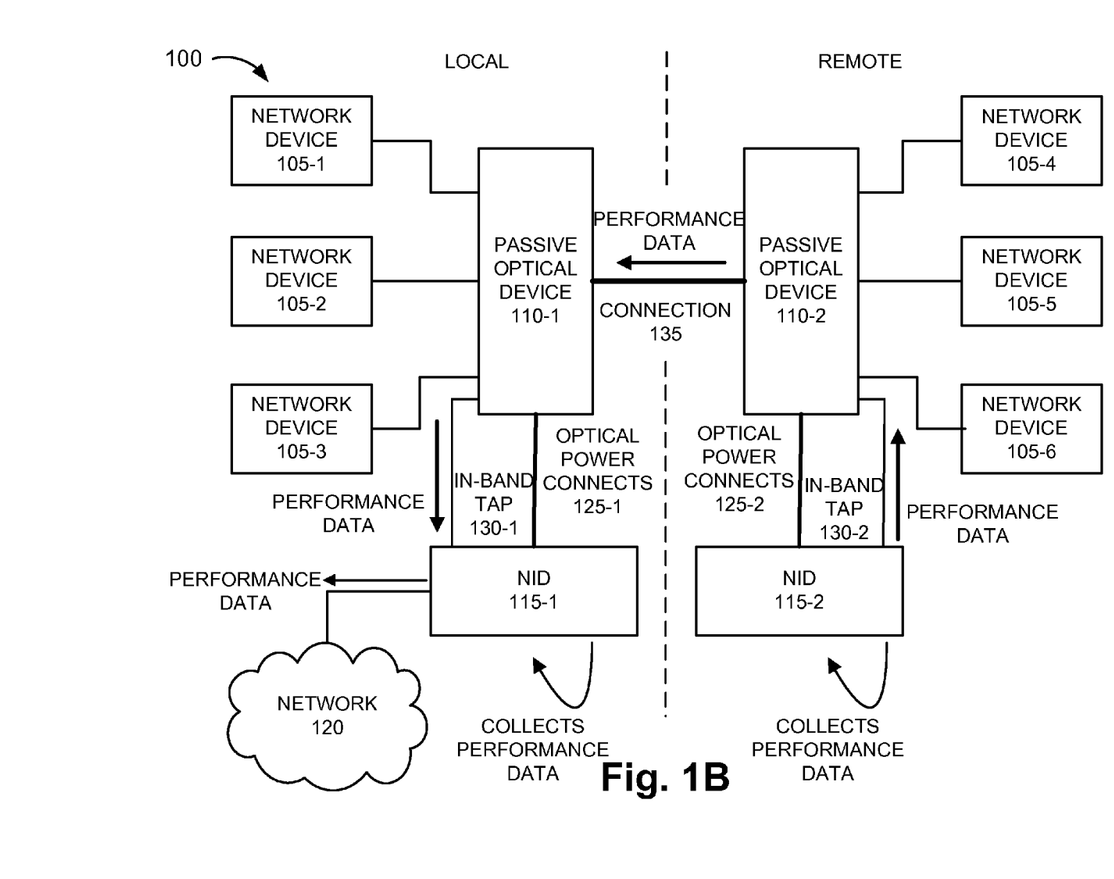
FIG. 1B is a diagram illustrating an exemplary process in which performance management may be implemented.

FIG. 1B is a diagram illustrating an exemplary process in which performance management may be implemented. In this example, assume that network interface devices 115 continually generate optical performance data (e.g., optical power performance data) based on the monitoring of passive optical devices 110 via optical power connects 125. Network interface device 115-1 outputs the optical performance data to network 120. However, network interface device 115-2 outputs the optical performance data via in-band tap 130-2, via connection 135 (e.g., out-of-band), and via in-band tap 130-1. Network interface device 115-1 may output the performance data of network interface device 115-2 to network 120. Additionally, or alternatively, network interface devices 115 may store the performance data, which may be accessed via network 120, by network administrators and/or a network management device.

Figure 1C:
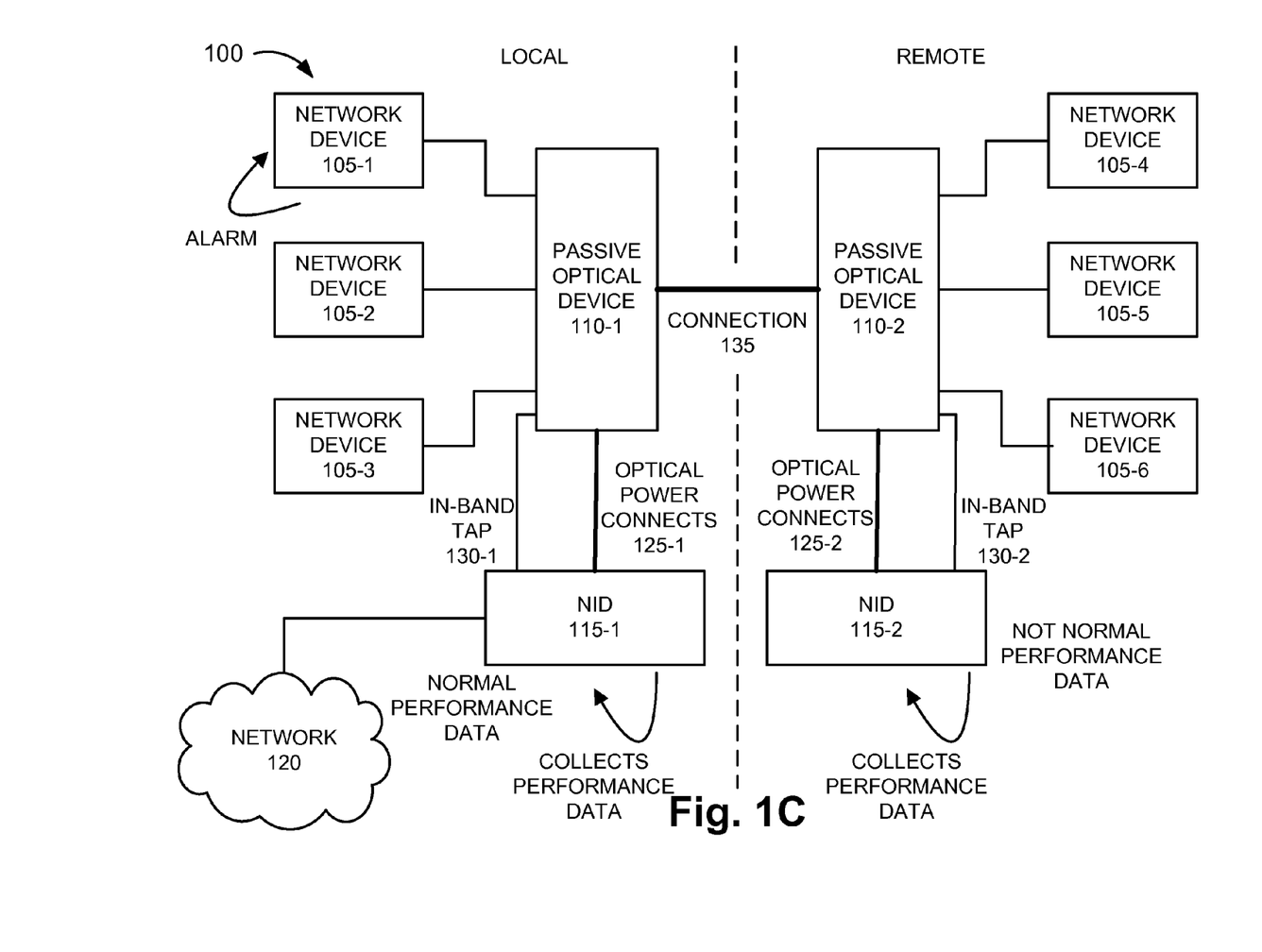
FIG. 1C is a diagram illustrating an exemplary scenario pertaining to performance management.

FIG. 1C is a diagram illustrating an exemplary scenario pertaining to performance management. In this example, assume network device 105-1 issues an alarm. The performance data from network interface device 115-1 indicates that the optical power levels are normal for passive optical device 110-1. However, assume that the performance data from network interface device 115-2 indicates that the optical power levels are not normal for passive optical device 110-2. According to this scenario, the performance data collected by network interface devices 115 may be used to isolate a fault in the optical network. For example, the fault may be isolated to connection 135 given optical power levels associated with passive optical devices 110-1 and 110-2.

Figure 1D:
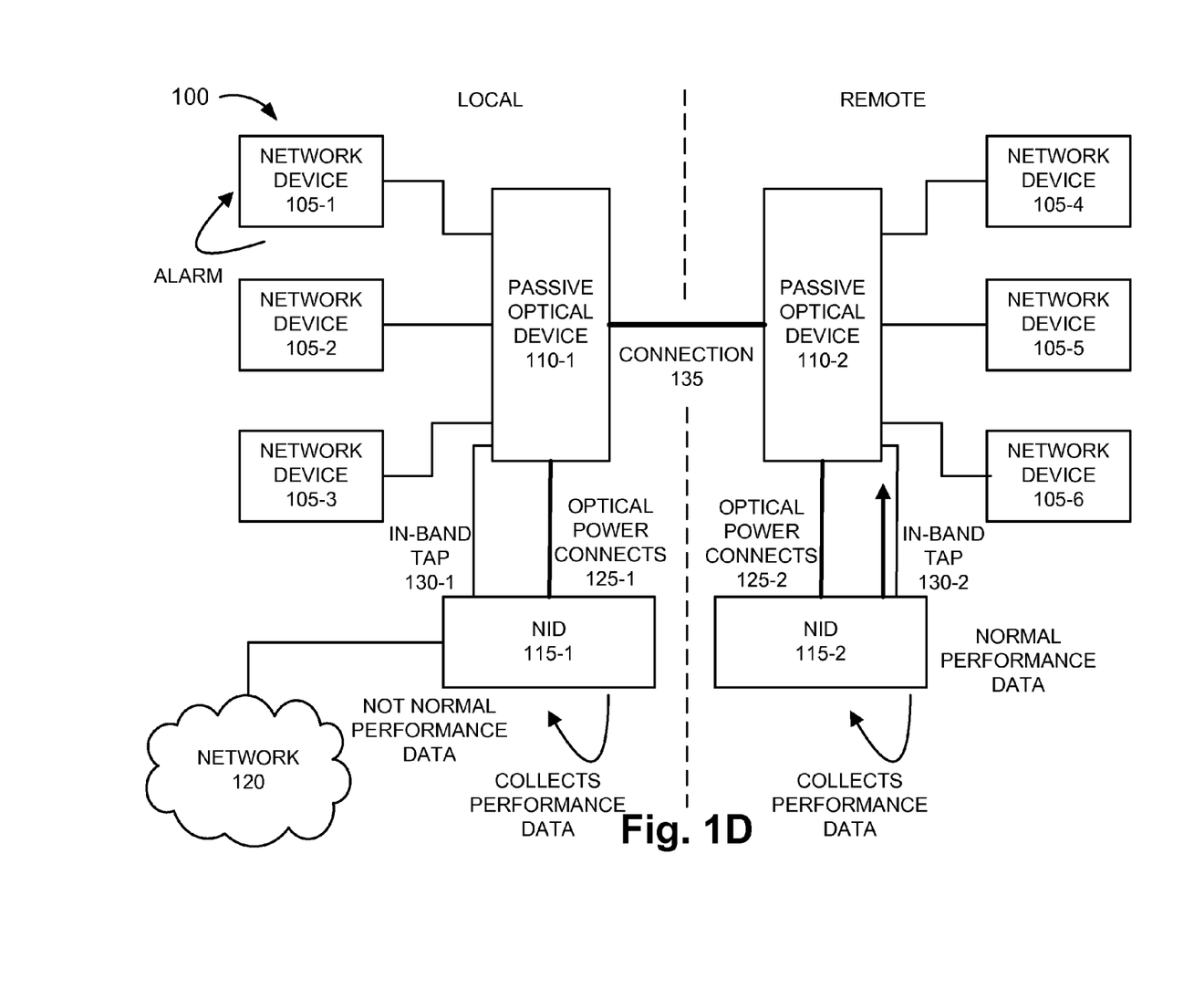
FIG. 1D is a diagram illustrating another exemplary scenario pertaining to performance management.

FIG. 1D is a diagram illustrating another exemplary scenario pertaining to performance management. In this example, assume network device 105-1 issues an alarm. The performance data from network interface device 115-1 indicates that the optical power levels are not normal for passive optical device 110-1. According to this scenario, the performance data collected by network interface device 115-1 may be used to isolate a fault in the optical network. For example, the fault may be isolated to network device 105-1, the connection between network device 105-1 and passive optical device 110-1, etc.

Figure 2:
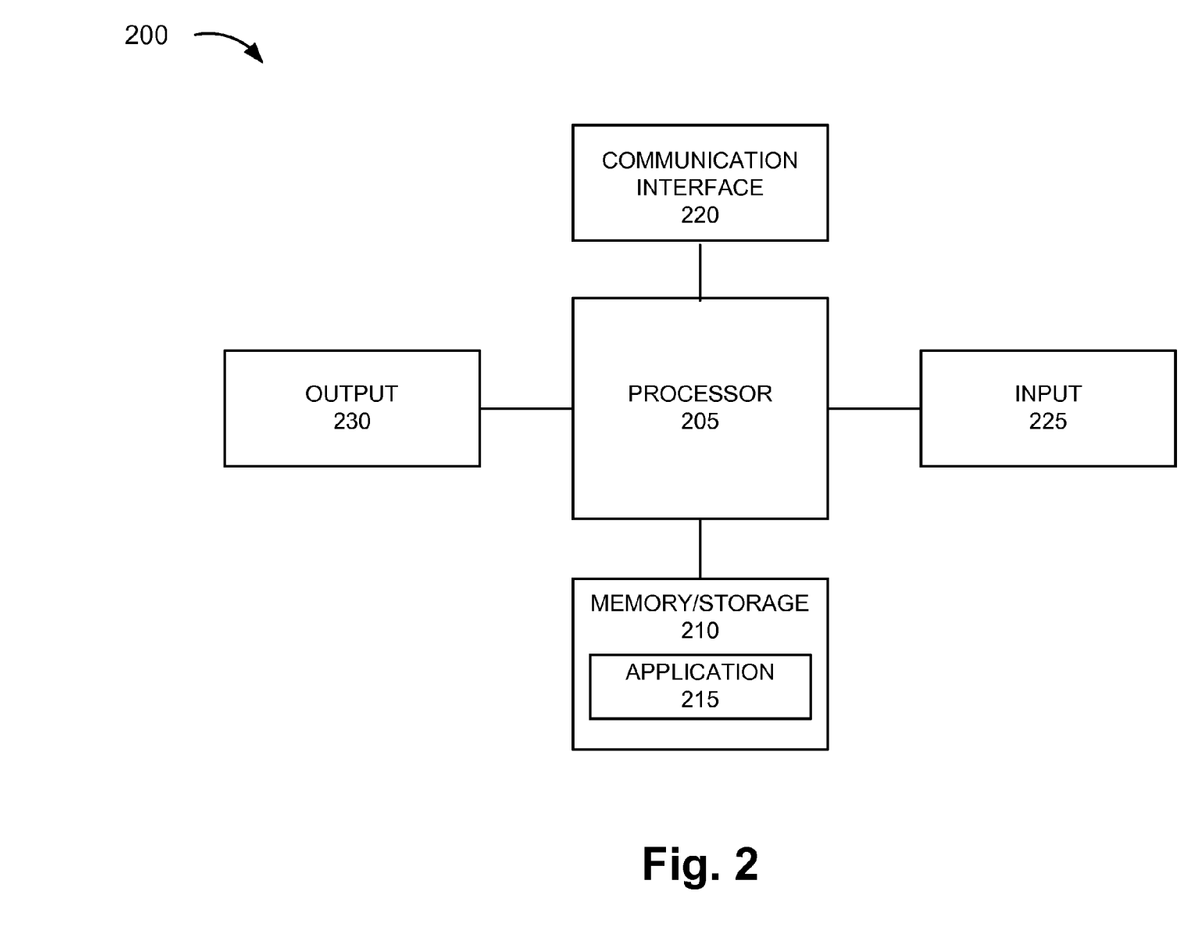
FIG. 2 is a diagram illustrating exemplary components of a device that may correspond to one or more of the devices in the environment depicted in FIGS. 1A-1D.

FIG. 2 is a diagram illustrating exemplary components of a device 200 that may correspond to one or more of the devices in environment 100. For example, device 200 may correspond to network interface devices 115 and one or more of network devices 105. As illustrated, according to an exemplary embodiment, device 200 may include a processor 205, memory/storage 210 including an application 215, a communication interface 220, an input 225, and an output 230. According to other embodiments, device 200 may include fewer components, additional components, different components, and/or a different arrangement of components than those illustrated in FIG. 2 and described herein.

Processor 205 may include one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (e.g., one or multiple cores), microcontrollers, and/or some other type of component that interprets and/or executes instructions and/or data. Processor 205 may be implemented as hardware (e.g., a microprocessor, etc.), a combination of hardware and software (e.g., a SoC, etc.), may include one or multiple memories (e.g., memory/storage 210), etc.

Processor 205 may control the overall operation or a portion of operation(s) performed by device 200. Processor 205 may perform one or multiple operations based on an operating system and/or various applications (e.g., application 215). Processor 205 may access instructions from memory/storage 210, from other components of device 200, and/or from a source external to device 200 (e.g., a network, another device, etc.).

Memory/storage 210 may include one or multiple memories and/or one or multiple other types of storage mediums. For example, memory/storage 210 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a phase-change memory (PCM), a dual in-line memory module (DIMM), a flash memory, and/or some other type of memory. Memory/storage 210 may include a hard disk (e.g., a magnetic disk, an optical disk, a magneto-optic disk, a solid state disk, etc.) a Micro-Electromechanical System (MEMS)-based storage medium, and/or a nanotechnology-based storage medium. Memory/storage 210 may include drives for reading from and writing to the storage medium.

Memory/storage 210 may be external to and/or removable from device 200, such as, for example, a Universal Serial Bus (USB) memory stick, a dongle, a hard disk, mass storage, off-line storage, or some other type of storing medium (e.g., a computer-readable medium, a compact disk (CD), a digital versatile disk (DVD), a Blu-Ray® disk (BD), etc.). Memory/ storage 210 may store data, application(s), and/or instructions related to the operation of device 200.

Application 215 may include software or a program that provides various services and/or functions. For example, with reference to network interface device 115 and according to an exemplary embodiment, application 215 may include one or multiple applications or programs that collect(s) performance data. According to an exemplary embodiment, the performance data pertains to optical power. According to another exemplary embodiment, the performance data may pertain to other performance metric(s) associated with the transmission of optical data. According to an exemplary embodiment, the software or the program may identify when an optical power problem exists and generates an alarm in response thereto, as described further below.

Communication interface 220 may permit device 200 to communicate with other devices, networks, systems, etc. Communication interface 220 may include one or multiple wireless interfaces and/or wired interfaces. Communication interface 220 may include one or multiple transmitters, receivers, and/or transceivers. Communication interface 220 may operate according to one or multiple protocols, standards, and/or the like.

Input 225 may permit an input into device 200. For example, input 225 may include a keyboard, a mouse, a microphone, a display, a touchpad, a touchscreen, a touchless screen, a button, a switch, an input port, and/or some other type of visual, auditory, tactile, etc., input component. Output 230 may permit an output from device 200. For example, output 230 may include a speaker, a display, a touchscreen, a touchless screen, a light, an output port, and/or some other type of visual, auditory, tactile, etc., output component.

Device 200 may perform processes and/or functions, as described herein, in response to processor 205 executing instructions (e.g., application 215) stored by memory/storage 210. By way of example, the instructions may be read into memory/storage 210 from another memory/storage 210 or from another device via communication interface 220. The instructions stored by memory/storage 210 may cause processor 205 to perform one or more processes described herein. Alternatively, for example, according to other implementations, device 200 may perform one or more processes described herein based on the execution of hardware (processor 205, etc.), the execution of hardware and firmware, or the execution of hardware, software, and firmware.

Figure 3A:
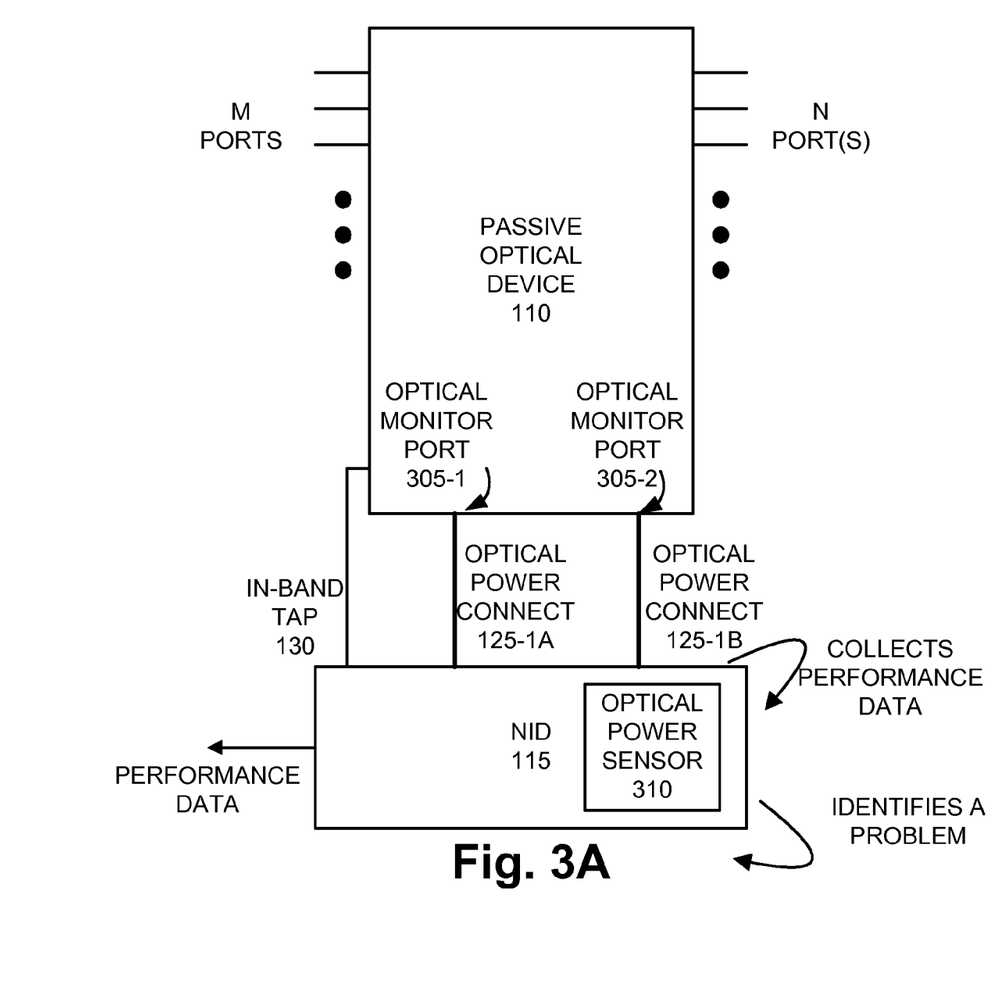
FIG. 3A is a diagram illustrating an exemplary process pertaining to the performance monitoring.

As previously described, network interface device 115 collects performance data from passive optical device 110. FIG. 3A is a diagram illustrating an exemplary process pertaining to the performance monitoring. As illustrated in FIG. 3A, passive optical device 110 includes M ports and N port(s), in which M≥2 and N≥1, and optical monitor ports 305-1 and 305-2 (referred to collectively as optical monitor ports 305 or individually as optical monitor port 305). Although not illustrated, passive optical device 110 may include an add/drop module.

Optical monitor ports 305 split a part of the optical signal (e.g., around 5%) from a port of passive optical device 110. For example, optical monitor port 305-1 may split a portion of the optical power from the aggregate of M-input port(s) and/or an optical monitor port 305-2 may split a portion of the optical power from the aggregate of N-output port(s). The optical signals output via optical power connects 125 are monitored by network interface device 115.

According to an exemplary process, network interface device 115 includes an optical power sensor 310 that measures an optical power. For example, optical power sensor 310 monitors an optical power associated with the input/output ports of passive optical device 110. The optical power may be monitored continuously based on a configurable sampling frequency.

According to another exemplary embodiment, optical power sensor 310 monitors optical power on a per-wavelength basis. For example, optical monitor ports dedicated to wavelengths of an optical signal may be used to monitor optical power on a per-wavelength basis. Optical power sensor 310 may take the form of an optical spectrum analyzer (OSA) to monitor optical power on a per wavelength basis. Alternatively, according to such an embodiment, optical power sensor 310 may take the form of a Small Form Plugable (SFP) module. However, in either case, this type of monitoring may impact the optical reach of the system and/or cost of the system.

According to yet another exemplary embodiment, network interface device 115 may include other sensors or devices to monitor other performance metrics (e.g., transmission delay, dispersion, etc.), as previously described.

As illustrated in FIG. 3A, network interface device 115 collects performance data. For example, network interface device 115 obtains optical power data from optical power sensor 310. For example, depending on the type of optical power sensor, the output may come in the form of an electrical current, a numeric value, or some other type of data. The optical power data may be associated with a timestamp. Additionally, for example, the optical power data may indicate whether the optical power data pertains to the M-ports or the N-port(s). For example, network interface device 115 may assign an identifier that indicates whether the optical power data is associated with the aggregate input ports (e.g., N-port(s)) or the aggregate output port(s)(e.g., N port(s)) of passive optical device 110. That is, for example, the N-port may include a transmit port and a receive port, or a single port capable of receiving and transmitting optical signals (e.g., bidirectional).

According to an exemplary embodiment, network interface device 115 outputs the performance data (e.g., optical power data). For example, the performance data may be output via network 120. According to another exemplary embodiment, network interface device 115 stores the performance data, which may be accessed (e.g., by network administrators, etc.) via network 120.

According to an exemplary embodiment, network interface device 115 may process the output from optical power sensor 310 before outputting the performance data and/or storing the performance data. For example, according to one implementation, network interface device 115 may calculate an average optical power over a particular time period based on the continuous optical power measurements by optical power sensor 310. As an example, according to such an implementation, network interface device 115 may calculate the average optical power over a 24 hour time period, a 15 minute period, or some other user-configurable time period. Network interface device 115 may also calculate other statistical information (e.g., deviation, highest optical power, lowest optical power, etc.) based on the optical power measurements. Network interface device 115 may store the optical power data of passive optical device 110 in a database or a data structure.

According to an exemplary embodiment, network interface device 115 may also identify when the performance data indicates a problem (e.g., a fault, below normal or accepted value(s), etc.). For example, network interface device 115 may compare the performance data to a threshold value(s) representative of normal operation. Based on the comparison, when a problem is identified, network interface device 115 generates an alarm (e.g., an alert), and outputs the alarm.

Figure 3B:
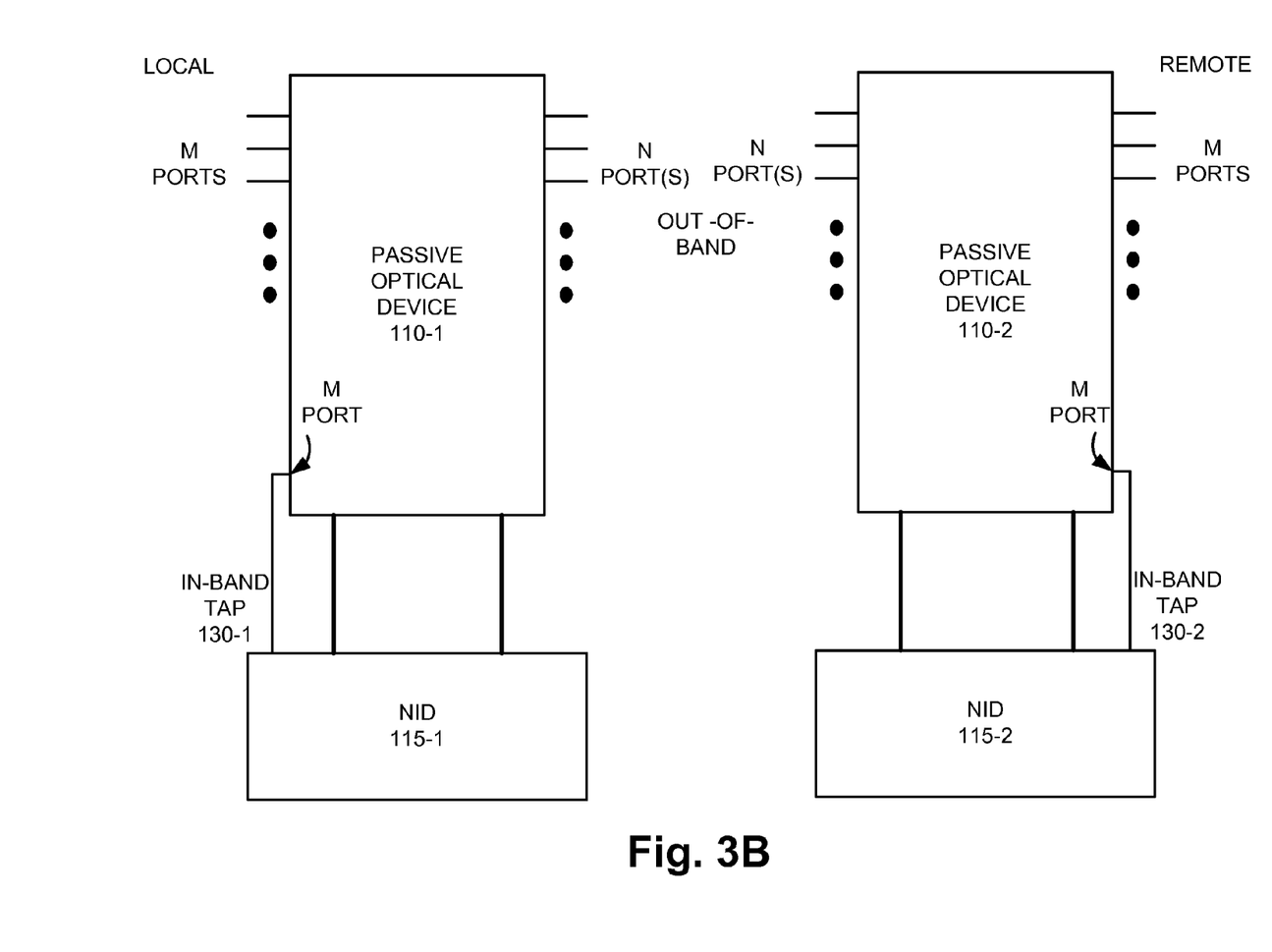
FIG. 3B is a diagram illustrating an exemplary communication path for network interface devices.

FIG. 3B is a diagram illustrating an exemplary optical communication path for network interface devices 115. As previously described, performance data may be stored by network interface devices 115 and obtained, for example, by network administrators or other network management devices via in-band taps 130 and connection 135 (e.g., N port(s)). Alternatively, network interface devices 115 may transmit performance data along the exemplary optical communication path. As illustrated, in-band tap 130 includes one end of the connection using one of the M ports of passive optical device 110. Communication along these legs of the communication path is in-band, whereas communication between passive optical devices 110 via N port(s) is out-of-band. According to such an embodiment, network interface devices 115 may be communicatively coupled (e.g., as a virtual network) regardless of the locations of network interface devices 115 (e.g., local, remote, etc.) relative to a network management site (e.g., a central office, etc.).

Figure 4:
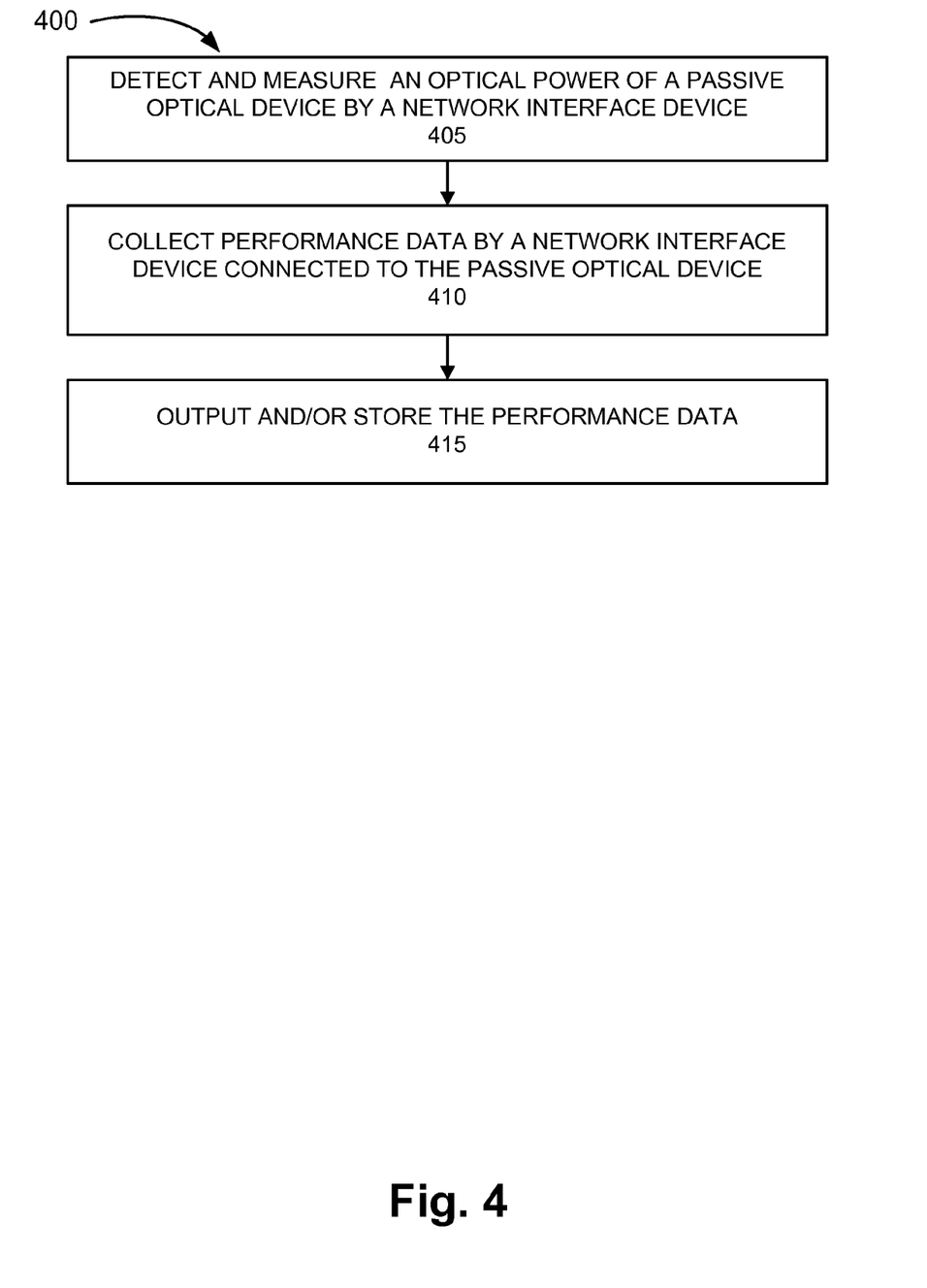
FIG. 4 is a flow diagram illustrating an exemplary process of performance monitoring using a network interface device.

FIG. 4 is a flow diagram illustrating an exemplary process 400 of performance monitoring using a network interface device. In block 405, the network interface device detects and measures optical power of a passive optical device. For example, optical power sensor 310 of network interface device 115 detects and measures an optical power associated with an optical signal output from passive optical device 110 via optical monitor port 305 and optical power connect 125. According to an exemplary embodiment, the optical power measured is only a portion of the total optical power since only a portion of the optical signal is measured.

In block 410, network interface device collects performance data. For example, network interface device 115 collects the optical power data from optical power sensor 310. The optical power data may be associated with a timestamp. Additionally, the optical power data may be associated with a particular set of ports (e.g., input ports, output ports) and/or other information (e.g., a wavelength, etc.). Network interface device 115 may also process the optical power data to generate statistical information pertaining to the optical power data (e.g., average optical power values over time, deviation value, etc.). According to an exemplary embodiment, the processing of optical power data may be based on a timer-based trigger. As an example, every 24 hour period, network interface device 115 calculates an average optical power value and/or other statistical information.

In block 415, network interface device outputs the performance data. For example, network interface device 115 outputs the optical power data via network 120. The performance data may be used to facilitate network management including fault isolation. Additionally, or alternatively, network interface device 115 may store the performance data in a database.

Although FIG. 4 illustrates an exemplary process 400 for performance monitoring, according to other implementations, process 400 may include additional operations, fewer operations, and/or different operations than those illustrated in FIG. 4 and described. For example, according to other embodiments, non-aggregate optical power data may be monitored and collected. Additionally, according to other embodiments, other types of performance data may be monitored and collected. Additionally, according to other embodiments, network interface device 115 may store performance data and the history of performance data may be obtained (e.g., by a person, another device, etc.).

Figure 5:
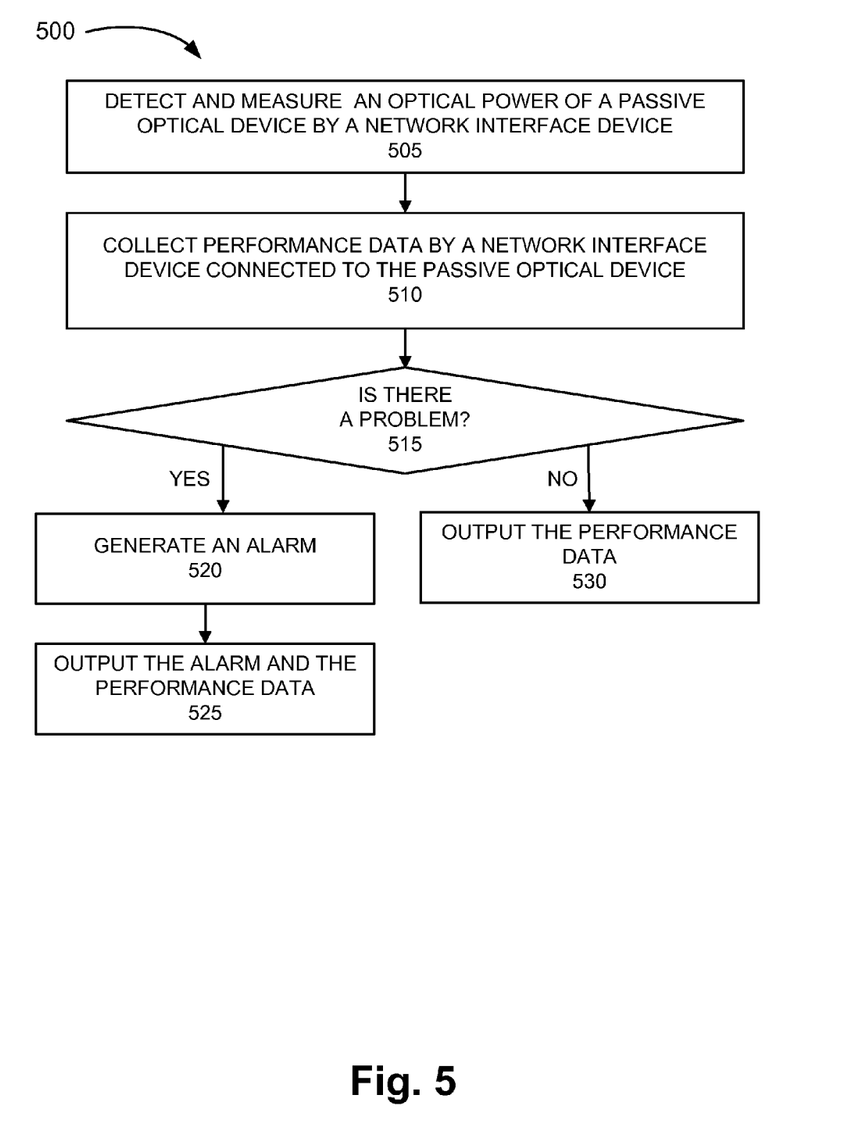
FIG. 5 is a flow diagram illustrating another exemplary process of performance monitoring using a network interface device.

FIG. 5 is a flow diagram illustrating another exemplary process 500 of performance monitoring using a network interface device. In block 505, the network interface device detects and measures optical power of a passive optical device. For example, optical power sensor 310 of network interface device 115 detects and measures an optical power associated with an optical signal output from passive optical device 110 via optical monitor port 305 and optical power connect 125. According to an exemplary embodiment, the optical power measured is only a portion of the total optical power since only a portion of the optical signal is measured.

In block 510, network interface device collects performance data. For example, network interface device 115 collects the optical power data from optical power sensor 310. The optical power data may be associated with a timestamp. Additionally, the optical power data may be associated with a particular set of ports (e.g., input ports, output ports) and/or other information (e.g., a wavelength, etc.). Network interface device 115 may also process the optical power data to generate statistical information pertaining to the optical power data (e.g., average optical power values over time, deviation value, etc.). According to an exemplary embodiment, the processing of optical power data may be based on a timer-based trigger. As an example, every 24 hour period, network interface device 115 calculates an average optical power value and/or other statistical information.

In block 515, it is determined whether a problem exists. For example, network interface device 115 compares the optical power data to threshold value(s) indicative of normal operation (e.g., accepted power levels, etc.). As an example, network interface device 115 performs a compare operation for each sampling period in which optical power data (e.g., an optical power value) is obtained. Network interface device 115 may store optical power threshold value(s) or a range of optical power values to be used for comparison.

If it is determined that a problem exists (block 515-YES), network interface device generates an alarm (block 520). For example, network interface device 115 may identify the appropriate alarm to generate based on the result of the comparison. For example, the alarms may differ in severity (e.g., threshold alarm versus severe alarm) and/or type. Network interface device 115 may store a mapping between optical power values and alarms to select the appropriate alarm. Once selected, network interface device 115 generates an alarm.

In block 525, network interface device outputs the alarm and the performance data. For example, network interface device 115 outputs the alarm and the performance data supporting the generation of the alarm via network 120. The performance data and the alarm may be used to facilitate network management including fault isolation.

If it is determined that a problem does not exist (block 515-NO), network interface device outputs performance data (block 530). For example, network interface device 115 outputs the optical power data via network 120. The performance data may be used to facilitate network management including fault isolation.

Although FIG. 5 illustrates an exemplary process 500 of performance monitoring, according to other implementations, process 500 may include additional operations, fewer operations, and/or different operations than those illustrated in FIG. 5 and described. For example, according to other embodiments, non-aggregate optical power data may be monitored and collected. Additionally, according to other embodiments, other types of performance data may be monitored and collected. Additionally, according to other embodiments, network interface device 115 may store performance data and the history of performance data and/or alarms may be obtained (e.g., by a person, another device, etc.).

Figure 6:
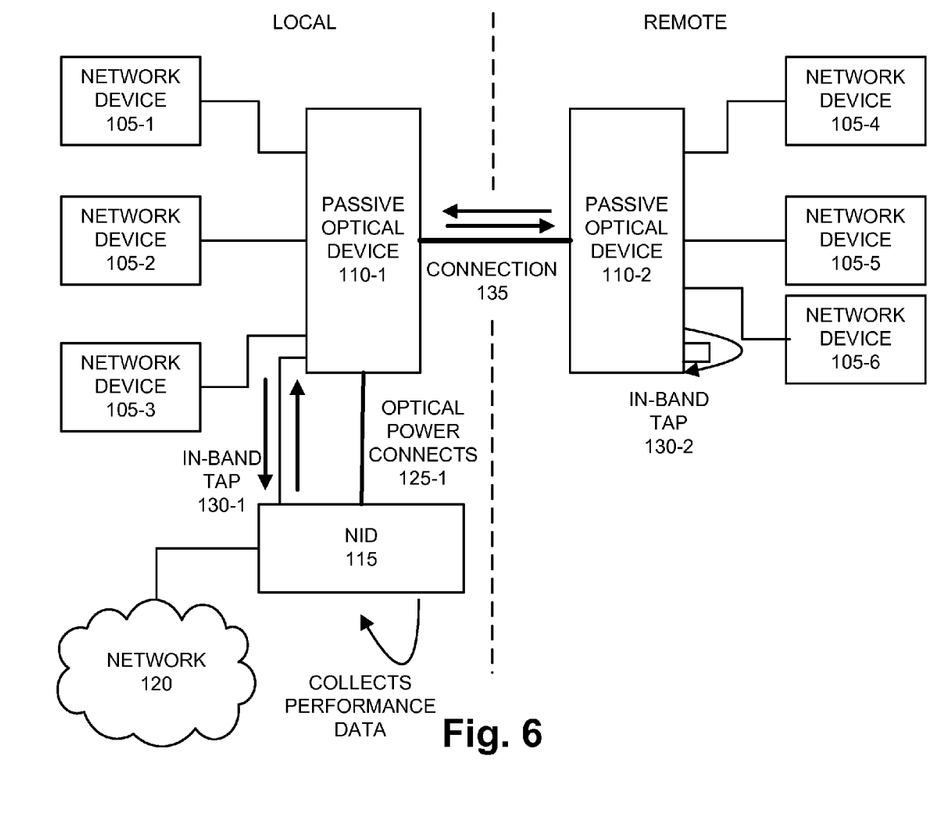
FIG. 6 is a diagram illustrating an exemplary process in which performance management may be implemented.

FIG. 6 is a diagram illustrating an exemplary process in which performance management may be implemented. As illustrated, according to this embodiment, optical power may be detected and measured based on a loop-back system. In this example, network interface device 115-2 and optical power connects 125-2 have been removed. Network interface device 115 may transmit an optical signal to passive optical device 110-2 via in-band tap 130-1 and connection 135. The optical signal may loop back to network interface device 115 via in-band tap 130-2. For example, an optical cable may plug into an input port and an output port, or other suitable configuration may be used to provide the looping back of the optical signal. Network interface device 115 may transmit the optical signal at a particular optical power, and when the optical signal returns, network interface device 115 detects and measures the optical power of the optical signal returned. Similar to that previously described, network interface device 115 collects the performance data and identifies whether a problem exists. For example, network interface device 115 calculates a difference in optical power and determines whether the difference indicates a problem. Network interface device 115 may generate an alarm, etc., if a problem exists, as previously described.

The foregoing description of implementations provides illustration, but is not intended to be exhaustive or to limit the implementations to the precise form disclosed. Accordingly, modifications to the implementations described herein may be possible.

The terms "a," "an," and "the" are intended to be interpreted to include "one or more." Further, the phrase "based on" is intended to be interpreted as "based, at least in part, on," unless explicitly stated otherwise. The term "and/or" is intended to be interpreted to include any and all combinations of one or more of the associated items.

In addition, while series of blocks are described with regard to the processes illustrated in FIGS. 4 and 5, the order of the blocks may be modified in other implementations. Further, non-dependent blocks may be performed in parallel. Additionally, with respect to other processes described in this description, the order of operations may be different according to other implementations, and/or operations may be performed in parallel.

An embodiment described herein may be implemented in many different forms of software and/or firmware executed by hardware. For example, a process or a function may be implemented as "logic" or as a "component." The logic or the component may include, for example, hardware, a combination of hardware and software, a combination of hardware and firmware, or a combination of hardware, software, and firmware.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

No element, act, operation, or instruction described in the present application should be construed as critical or essential to the embodiments described herein unless explicitly described as such.

What is claimed is:

1. A system comprising:
   a passive optical device;
   a network interface device; and
   an optical connection between the passive optical device and the network interface device, wherein the network interface device comprising:
      an optical power sensor configured to:
         receive optical signals from the passive optical device via the optical connection; and
         measure an optical power of the optical signals;
      a memory to store instructions; and
      a processor to execute the instructions and configure the network interface device to:
         obtain optical power data based on an output of the optical power sensor, wherein the optical power data includes optical power data pertaining to an aggregate of input ports of the passive optical device or optical power data pertaining to an aggregate of output ports of the passive optical device;
         time-stamp the optical power data;
         assign an identifier that indicates whether the optical power data is associated with the aggregate of input ports or the aggregate of output ports; and
         at least one of store or output the optical power data.

2. The system of claim 1, wherein the system includes an optical wavelength-division multiplexing network, and the passive optical device further comprising:
   an optical monitor port configured to split a portion of an optical power associated with the aggregate of input or output ports of the passive optical device.

3. The system of claim 1, wherein the network interface device is an Ethernet network interface device.

4. The system of claim 1, further comprising:
   a remote passive optical device;
   a remote network interface device;
   another optical connection between the remote passive optical device and the remote network interface device, wherein the remote network interface device comprising:
      a remote optical power sensor configured to:
         receive optical signals from the remote passive optical device via the other optical connection; and
         measure an optical power,
   wherein the remote network interface device comprising:
      a memory to store instructions; and
      a processor to execute the instructions and configure the remote network interface device to:
         obtain remote optical power data based on an output of the remote optical power sensor; and
         output the remote optical power data.

5. The system of claim 4, further comprising:
   a remote, in-band optical connection between the remote passive optical device and the remote network interface device; and
   an in-band optical connection between the passive optical device and the network interface device, wherein the processor of the network interface device further executes the instructions and configures the network interface device to:
      receive the remote optical power data output from the remote network interface device via the in-band optical connection.

6. The system of claim 1, wherein the processor executes the instructions and further configures the network interface device to:
compare the optical power data to a threshold optical power value;
identify whether a problem exists based on a result of a comparison;
select a type of alarm when a problem is identified based on the result;
generate the alarm; and
output the alarm.

7. A network interface device, comprising:
an optical power sensor configured to:
receive optical signals from a passive optical device via an optical connection to the passive optical device;
measure optical powers pertaining to the optical signals;
a memory to store instructions; and
a processor to execute the instructions and configure the network interface device to:
obtain optical power data from an output by the optical power sensor, wherein the optical power data includes optical power data pertaining to an aggregate of input ports of the passive optical device or optical power data pertaining to an aggregate of output ports of the passive optical device;
timestamp the optical power data;
store the optical power data;
assign an identifier that indicates whether the optical power data is associated with the aggregate of input ports or the aggregate of output ports; and
output the optical power data.

8. The network interface device of claim 7, wherein the processor executes the instructions and further configures the network interface device to:
calculate statistical information pertaining to the optical power data, wherein the statistical information includes at least one of a highest optical power, a lowest optical power, or a deviation.

9. The network interface device of claim 7, wherein the processor executes the instructions and further configures the network interface device to:
receive remote optical power data pertaining to a remote passive optical device via an in-band connection with the passive optical device; and
output the remote optical power data.

10. The network interface device of claim 7, wherein the processor executes the instructions and further configures the network interface device to:
compare the optical power data to a threshold optical power value;
identify whether a problem exists based on a result of a comparison;
generate an alarm when the result indicates that the problem exists; and
output the alarm.

11. The network interface device of claim 7, wherein the network interface device is an Ethernet network interface device, and the passive optical device includes a passive optical coupler.

12. The network interface device of claim 7, wherein the processor executes the instructions and further configures the network interface device to:
calculate statistical information pertaining to the optical power data, wherein the statistical information includes an average optical power over one or more time periods.

13. A method comprising:
receiving, by a network interface device, optical signals from a passive optical device;
detecting, by the network interface device, the optical signals;
measuring, by the network interface device, optical power pertaining to the optical signals;
storing, by the interface network device, optical power data corresponding to the optical power, wherein the optical power data includes optical power data pertaining to an aggregate of input ports of the passive optical device or optical power data pertaining to an aggregate of output ports of the passive optical device;
time-stamping the optical power data; and
assigning an identifier that indicates whether the optical power data is associated with the aggregate of input ports or the aggregate of output ports.

14. The method of claim 13, wherein the optical signals correspond to a portion of optical power received by the passive optical device via at least one of the aggregate of input ports or the aggregate of output ports of the passive optical device.

15. The method of claim 13, further comprising:
comparing the optical power data to a threshold optical power value;
identifying whether a problem exists based on a result of the comparing;
selecting a type of alarm when a problem is identified based on the result;
generating the alarm; and
outputting the alarm.

16. The method of claim 13, further comprising:
receiving remote optical power data output from a remote network interface device via an in-band optical connection with the passive optical device; and
transmitting the remote optical power data to another device.

17. The method of claim 13, further comprising:
calculating statistical information pertaining to the optical power data, wherein the statistical information includes an average optical power over one or more time periods.

18. The method of claim 13, wherein the measuring further comprises:
measuring the optical power pertaining to the optical signals on a per-wavelength basis.

19. The method of claim 13, further comprising:
calculating statistical information pertaining to the optical power data, wherein the statistical information includes at least one of a highest optical power, a lowest optical power, or a deviation.

20. The method of claim 13, wherein the storing comprises:
storing a database that includes the optical power data;
receiving a request to access the database; and
providing access, in response to the request, to the database.

21. A method comprising:
receiving, by a network interface device, optical signals from a passive optical device;
detecting, by the network interface device, the optical signals;
measuring, by the network interface device, optical power pertaining to the optical signals;
storing, by the network interface device, optical power data corresponding to the optical power;
receiving remote optical power data output from a remote network interface device via an in-band optical connection with the passive optical device; and
transmitting the remote optical power data to another device.

* * * * *